(12) United States Patent
Heng et al.

(10) Patent No.: US 6,716,782 B2
(45) Date of Patent: Apr. 6, 2004

(54) RIGID INSULATION AND METHOD OF PRODUCING SAME

(75) Inventors: Vann Heng, Buena Park, CA (US); Karrie Ann Hinkle, Aliso Viejo, CA (US); Mary Ann Santos, West Covina, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/222,622

(22) Filed: Aug. 16, 2002

(65) Prior Publication Data

US 2004/0033881 A1 Feb. 19, 2004

(51) Int. Cl.$^7$ .................. C04B 35/80; C04B 35/563
(52) U.S. Cl. .................. 501/95.1; 501/95.2; 501/87; 428/293.4; 428/293.7; 264/640; 264/641
(58) Field of Search .................. 501/95.1, 95.2, 501/87; 428/293.4, 293.7; 264/640, 641

(56) References Cited

U.S. PATENT DOCUMENTS

| | | | |
|---|---|---|---|
| 4,303,716 A | 12/1981 | Eshbach et al. | |
| 4,684,480 A | 8/1987 | Lipp et al. | |
| 4,849,276 A | 7/1989 | Bendig et al. | |
| 5,067,998 A | 11/1991 | Singh et al. | |
| 5,079,082 A | 1/1992 | Leiser et al. | |
| 5,091,242 A | 2/1992 | Chung | |
| 5,110,652 A | 5/1992 | Allaire et al. | |
| 5,132,155 A | 7/1992 | Singh et al. | |
| 5,198,282 A | 3/1993 | Baker et al. | |
| 5,229,196 A | 7/1993 | Seibold et al. | |
| 5,403,653 A | 4/1995 | Moreton et al. | |
| 5,490,468 A | 2/1996 | Polensky | |
| 5,536,562 A | 7/1996 | Tran et al. | |
| 5,556,689 A * | 9/1996 | Kratel et al. ................. | 428/137 |
| 5,560,569 A | 10/1996 | Schmidt | |
| 5,721,036 A | 2/1998 | Tingley | |
| 5,849,650 A | 12/1998 | Rorabaugh et al. | |
| 5,863,846 A | 1/1999 | Rorabaugh et al. | |
| 5,911,903 A * | 6/1999 | Eyhorn et al. ................. | 252/62 |
| 5,958,583 A | 9/1999 | Rorabaugh et al. | |
| 5,985,433 A | 11/1999 | Leiser et al. | |
| 6,114,050 A | 9/2000 | Westre et al. | |

* cited by examiner

Primary Examiner—Karl Group
(74) Attorney, Agent, or Firm—Alston & Bird LLP (57) ABSTRACT

A porous ceramic fiber insulating material and method of making a material having a combination of silica ($SiO_2$) and alumina ($Al_2O_3$) fibers, and boron-containing powders is the topic of the new invention. The insulative material is composed of about 60 wt % to about 80 wt % silica fibers, about 20 wt % to about 40 wt % alumina fibers, and about 0.1 wt % to about 1.0 wt % boron-containing powders. A specific boron-containing powder used for this invention is boron carbide powder which provide boron-containing by-products, which aid in fusion and sintering of the silica and alumina fibers. The material is produced by forming an aqueous slurry, blending and chopping the fibers via a shear mixer, orienting the fibers in the in-plane direction, draining water from the fibers, pressing the fibers into a billet, heating the fibers to remove residual water, and firing the billet to fuse the fibers of the material. After sintering, bulk density of the new insulation material ranges from 6 to 20 lb/ft$^3$.

39 Claims, 5 Drawing Sheets

← In-Plane Direction →

FIG. 3.

← In-Plane Direction →

RIGID INSULATION AND METHOD OF PRODUCING SAME

FIELD OF THE INVENTION

This invention describes porous ceramic fiber insulating materials and methods for their production. More specifically, the invention relates to ceramic fiber insulating materials for use as a high temperature thermal protection system on commercial, military and space vehicles.

BACKGROUND OF THE INVENTION

Reusable launch vehicles (RLVs), such as the space shuttle, repeatedly travel into or beyond the Earth's upper atmosphere and then return to the Earth's surface. During flight, the RLVs experience extreme temperatures, ranging from −250° F. while in orbit to over 3000° F. upon reentry to the atmosphere. Because of the extreme temperatures, the vehicle and its compartments must be protected by a thermal protection system. The thermal protection system is an outer covering of insulation, the purpose of which is to prevent the body of the vehicle from reaching a certain maximum temperature. For the space shuttle, the maximum temperature is about 450° F., the temperature at which the aluminum structure of the shuttle begins to weaken.

Thermal protection systems for RLVs are constructed from a large number, usually several thousand, of insulative rigid tiles and blankets. The tiles, which are used mostly on the lower surface due to their smoother surface, function to insulate the vehicle from the environment and to radiate and reflect heat from the vehicle. In addition to protecting the vehicle from environmental heat sources, the insulative tiles also provide protection from localized heating from sources such as the vehicle's main engine, rocket boosters and directional thrusters.

RLVs such as the space shuttle typically utilize a variety of tiles to cover the lower surface of the vehicle. Different areas of the vehicle encounter different heat profiles and different physical stresses during flight. Therefore, a variety of tiles having different shapes, sizes, compositions, densities, and coatings are placed at different positions of the vehicle depending on whether such positions are leeward or windward, upper or lower surfaces, etc. The most predominate tiles used today on lower surface are 9 lb/ft$^3$ Lockheed Insulation (LI-900). Alumina Enhanced Thermal Barrier 8 lb/ft$^3$ (AETB-8) tiles are used on the base heat shield due to their relatively higher thermal conductivity and better durability.

The Lockheed Insulation materials are comprised of high purity amorphous silica fiber. To produce the Lockheed Insulation, silica fibers having a diameter of 1 to 3 μm are mixed with de-ionized water in a v-blender and thereby form a slurry. The slurry is mixed with ammonia and stabilized colloidal silica solution after which, it is placed in a casting tower where it is dewatered and slightly pressed to remove a portion of the water. The partially dried slurry is heated to a temperature of 250° F. to remove the remaining residual water. The dried silica composition is then fired to a temperature of up to 2300° F., which causes the colloidal silica to sinter the fibers to one another. The resulting insulative material is a low-density mass of randomly arranged fused silica fibers. By selectively pressing the silica fiber slurry and subjecting to different firing temperatures, various densities of the rigidized silica fibers may be produced. The Lockheed Insulation tiles are marketed under the trade names LI-900™, LI-1500™ and LI-2200™, having densities of 9 lb/ft$^3$, 15 lb/ft$^3$ and 22 lb/ft$^3$, respectively.

The Alumina Enhanced Thermal Barrier (AETB), invented by NASA Ames Research Center, consists of about 68 percent silica fiber, about 12 percent Nextel fiber (a combination of alumina, silica, and borate), about 20 percent alumina fiber, and about 2 percent silicon carbide powder. The fiber diameter ranges from 1 to 3 μm for silica and alumina fibers, and from 5 to 10 micron for Nextel fibers. The processing is very similar to that used for the Lockheed Insulation. Colloidal silica is not added to the AETB material before firing. Instead, high temperatures experienced during firing cause the borate contained in the Nextel fiber to form boron oxide, which fuses to the fibers and sinters the ceramic fibers to one another. The AETB material is commonly marketed in the forms of AETB-8™, AETB-12™, and AETB-20™ tiles, having densities of 8 lb/ft$^3$, 12 lb/ft$^3$, and 20 lb/ft$^3$ respectively.

Because of its extraordinary low thermal conductivity, LI-900™ insulation tiles are used on a majority of the lower surface of the space shuttle. Reaction Cured Glass (RCG) is applied on the outer surface of LI-900™ tiles to emit high heat encountered during reentry into the Earth's atmosphere. LI-900™ insulation, however, suffers from two main disadvantages. First, it suffers from severe shrinkage when exposed to temperatures above 2500° F. for long periods of time. Shrinkage along the outer mold line of thermal protection materials leads to widening gaps as well as forming surface recession and thus increases localized heating at the inner substructure mold line. Second, LI-900™ and other pure-silica tile insulations are not compatible with the tough coating, TUFI (Toughened Unipiece Fibrous Insulation), which is needed for improved surface durability. Application of TUFI coating results in slumping of the pure silica insulation. Because of incompatibility with the tough coating, LI-900™ materials are easily susceptible to damage during flight or servicing of the RLV.

Unlike LI-900™ insulation, the AETB material is compatible with the TUFI coating. As a result, the AETB is a much more durable tile system, which requires less frequent replacement. AETB, however, is more thermally conductive than the LI-900 tile materials. As a result of the increased thermal conductivity, the AETB material can only be used in benign areas such as base heat shield. Therefore, AETB may not be used on the lower surface of the RLVs.

What is needed is a ceramic fiber insulative material having the same or lower thermal conductivity found in LI-900™ insulation while exhibiting the durability, dimensional stability, and strength of AETB.

SUMMARY OF THE INVENTION

The present invention is an insulating material for use in extreme temperatures up to 2400° F. for multiple use, and 2700° F. for single use. The tile materials can be used in a variety of applications. The insulating material is a unique combination of ceramic fibers, which are sintered together to form a low density, highly porous material with very low thermal conductivity. The new tile insulation exhibits a high tensile strength, and outstanding dimensional stability and durability to withstand damage typically suffered during flight and servicing of the RLV.

The basis of the invention is the combination of silica (SiO$_2$) and alumina (Al$_2$O$_3$) fibers, and boron-containing powder that are used as a sintering agent. The insulative material is composed of about 60 wt % to about 80 wt % silica fibers, about 20 wt % to about 40 wt % alumina fibers, and about 0.1 wt % to about 1.0 wt % boron-containing powder.

During processing, the boron-containing powder provides boron-containing by-products which fuse and sinter the silica and alumina fibers when heated to elevated temperatures. Thus, no supplemental binder is required during production of the insulative material. It has been found that use of the boron-containing powder allows the use of lower amounts (relative to Nextel fibers used in AETB production) to form sufficient sintering between the fibers. This small amount of boron-containing powder is replacing a relatively large amount of Nextel fibers (12 to 15 wt %), which is one of the high cost components and is found to provide adverse effects on the thermal conductivity due to its larger diameter.

The new tile material is produced by dispersing the ceramic fibers in an aqueous solution forming a slurry. The slurry is blended using the shear mixer, which disperses the fibers evenly throughout and chops them to a certain length. By using a shear mixer, the fibers tend to be oriented lengthwise in the direction of the radial flow of the slurry during mixing. In the finished tile, the fibers are substantially oriented in the direction perpendicular to the press direction of the slurry, making this material anisotropic. This arrangement of fibers results in much lower thermal conductivity along the press direction (through-the-thickness) relative to the direction perpendicular to the press direction (in-plane).

After mixing and chopping, the slurry is optionally classified through a separation means in order to remove undesirable solids, known as inclusions or shot, from the fiber slurry suspension. The insulative characteristic of the material stems from having small diameter ceramic fibers surrounded by large volumes of air. High-density ceramic shot or clumps are detrimental to the effectiveness of the insulation properties, and are therefore removed before the material is pressed.

After filtration of the shot and/or clumps, the slurry is pumped into the mold, otherwise known as the casting box, from which the fibers are drained and pressed. Water removal is accomplished via gravity drain through the porous bottom of the casting box. Acceleration of the draining step is done by the application of a vacuum at the bottom of the casting box. The slurry is pressed to produce a wet billet of ceramic fiber. The slurry is preferably pressed in the vertical direction, by moving a top surface downwards and pressing upon the fibers. The vertical press direction is also called "through-the-thickness" direction. The geometry of the top surface, otherwise known as the press plate, is preferably similar to that of the billet to reduce, if not eliminate, fiber layer separation caused by surface friction with the inner walls of the casting box.

After pressing, the wet billet is dried and fired. The drying step removes residual moisture from the billet. The firing step fuses the fibers to one another to produce a rigid body and to provide structural integrity. Drying occurs at approximately 200 to 500° F. for at least 24 hours. Firing occurs at a temperature between about 2300° F. and about 2600° F. for about 1 to about 5 hours.

The fused insulative material is finally machined into the shape of a tile, normally in the 6-inch by 6-inch planform and with thickness ranging from 1 to 3 inches. The tile is machined so that the top surface and the bottom surface of the tile are roughly parallel to the direction of the fiber alignment within the tile material. This arrangement provides an increase in tensile strength in the in-plane direction, which prevents the shrinkage and slumping that is problematic in the older generation tiles. For example, tensile strength of a new tile having a bulk density of 8 lbs/ft$^3$ is approximately 110–140 lbs/in$^2$ in the in-plane direction and approximately 35–55 lbs/in$^2$ in the through-the-thickness direction. The direction is termed as "in-plane" when it is perpendicular to the fiber press direction, while "through-the-thickness" direction is termed when it is parallel to the fiber press direction. The strength of the tile is sufficient to support a reaction-cured glass (RCG) and TUFI coating applied on the outer surface of the tile without problems associated with slumping.

The insulative material exhibits very low thermal conductivity, particularly in the through-the-thickness direction. One of the primary reasons for low thermal conductivity is due to the fibers which are preferentially aligned in the in-plane direction, and thus substantially reducing the thermal conductivity in the through-the-thickness direction. The other reason is due to the finer diameter of $SiO_2$ and $Al_2O_3$ fibers promoting radiation scattering more effectively compared to the fibers having relatively larger diameter such as Nextel fibers.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The basis of the invention is the combination of silica ($SiO_2$) and alumina ($Al_2O_3$) fibers, and boron-containing powder, particularly boron carbide ($B_4C$) powder, which primarily act as the sintering aid. The insulative material is composed of about 60 wt % to about 80 wt % silica fibers, about 20 wt % to about 40 wt % alumina fibers, and about 0.1 wt % to about 1.0 wt % boron-containing powder. The preponderance of the insulative capability is provided by the silica fiber and the fiber orientation. The large percentage of silica within the insulation provides a material with favorable thermal conductivity. Because of the large percentage of silica and inplane fiber orientation, the invented material has low thermal conductivity similar to that of LI-900™ insulation.

The large content of alumina fibers, about 20 wt % to about 40 wt %, provides dimensional stability and higher temperature capability to the material. Because of the large percentage of alumina, the material is able to resist slumping and shrinkage at temperatures up to 2800° F. Because the alumina content is similar to that of AETB, the material has dimensional stability, durability, and strength similar or superior to the AETB material.

The ability to effectively sinter both silica and alumina fibers is through the use of about 0.1 wt % to about 1.0 wt % boron-containing powder within the material. During processing and firing of the material, the boron-containing powder forms boron-containing by-products which aid in fusing the silica and alumina fibers to one another. Thus, the fibers of the material may be fused and sintered without the requirement of supplemental binders, such as the colloidal silica required for processing of LI-900™ insulation or Nextel fibers required for processing of AETB-8 tile material.

As noted, the boron-containing powder of the material provide boron-containing by-products which act to fuse and sinter the silica and alumina fibers of the material when heated to elevated temperatures. Nextel™ fibers (aluminaborosilicate) used in AETB materials also serve the function of providing boron by-products, which sinter fibers to one another. However, it has been found that similar sintering properties may be obtained through the use of boron-containing powder at a much lower percentage than the Nextel fibers required for preparation of AETB material. AETB material requires approximately 12 to 15 wt % of Nextel™ fiber, compared to the relatively small percentage of about 0.1 wt % to about 1.0 wt % boron-containing powder used in the insulative material.

Use of the boron-containing powder has two main advantages over the Nextel™ or other aluminaborosilicate fibers. First, relatively small amount of the powder is required to properly sinter the fibers, thus allowing a larger percentage of both silica fiber and alumina fiber to be used within the material. Over 99% of the fibers are either silica, which exhibits favorable thermal conductivity properties, or alumina, which exhibits favorable dimensional stability and higher temperature capability. Second, boron-containing fibers, such as Nextel™ fibers are typically more expensive to produce than either silica fibers or alumina fibers. Reduction in the overall amount of boron-containing fiber within the insulative material dramatically reduces the overall cost of the material. Boron-containing powders are readily available and cost approximately an order of magnitude lower than the aluminoborosilicate fibers.

A preferred embodiment of the invention combines ceramic fibers of about 65 wt % to about 75 wt % silica fibers, about 25 wt % to about 35 wt % alumina fibers, and about 0.1 wt % to about 0.5 wt % boron-containing powders. A particularly preferred embodiment combines about 67 wt % silica fibers, about 32.75 wt % alumina fibers, and about 0.25 wt % boron-containing powders.

The diameter of the fibers affects the conductivity of the overall ceramic fiber material. Material with fibers having a diameter below a minimum value will lack the strength to provide structural support to the tile material during high temperature exposure. High temperature exposure may therefore result in slumping or shrinkage of the material. Conversely, materials with fibers having a diameter above a maximum value have thermal conductivity properties that are relatively high due to the increased size of the thermally conductive solid ceramic fibers. Acceptable thermal conductivity is provided by fiber diameters within the approximate range of about 0.5 µm to about 5.0 µm. Preferred fiber diameter is about 3.0 µm.

Figure 1:
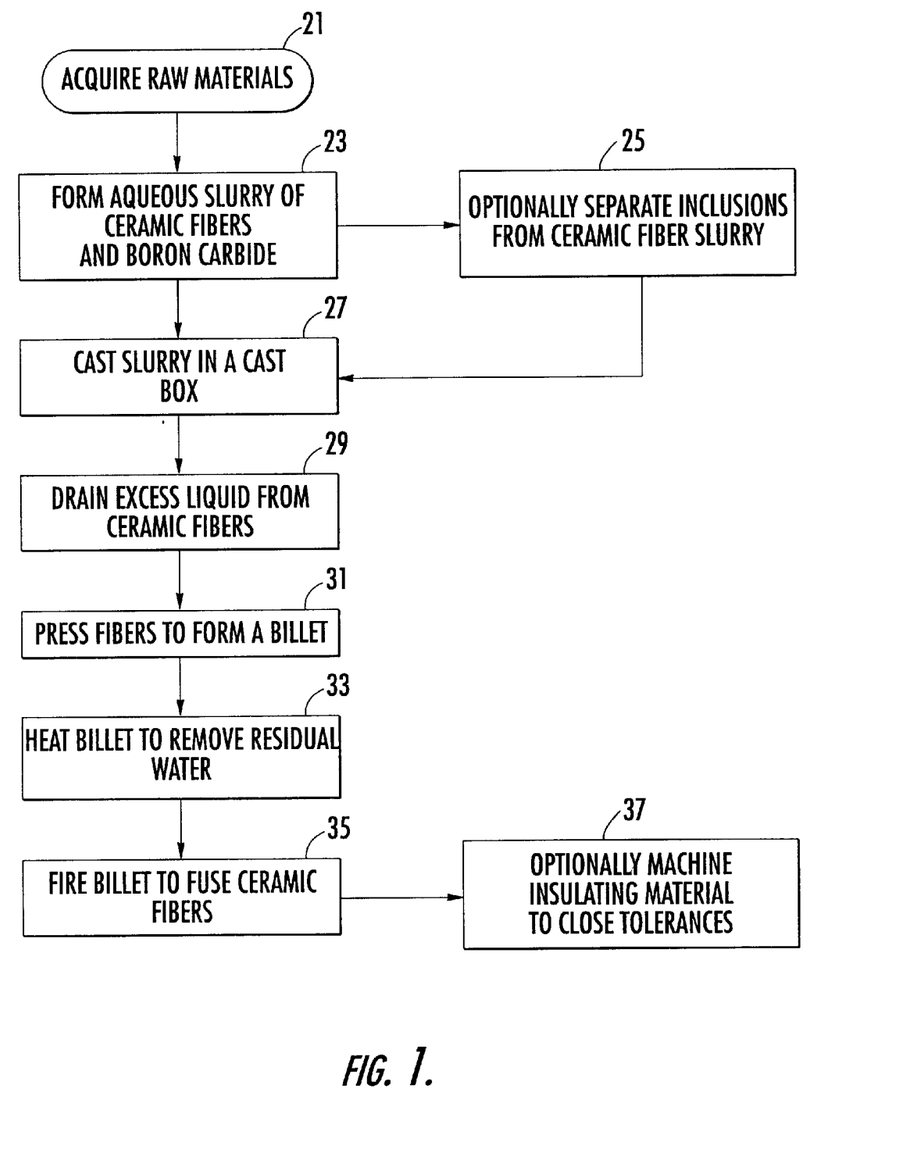
FIG. 1 is a schematic representation of a method of producing an embodiment of the invented material.

The various fibers of the material are acquired and blended together, step 21, in an aqueous solution with a boron-containing powder such as boron carbide, step 23, such that the resulting slurry contains fibers that are more or less randomly dispersed among one another. For blending, the fibers are first suspended in the aqueous solution. The solution serves as a medium from which the fibers may easily be blended with one another. Further, the aqueous solution provides as a carrier with which to transport the fibers from the mixing tub to the casting box. Typical ratio of fiber mixture to water is about 60–80 g of fiber mixture per every gallon of de-ionized water. When the fiber mixture is higher than 80 g, the fiber slurry viscosity is too high to form uniform fiber mixing and dispersion. When the fiber mixture is less than 60 g, the solution viscosity is too low to achieve effective mixing and chopping thus, causing non-uniform fiber dispersion within a billet.

Figure 2:
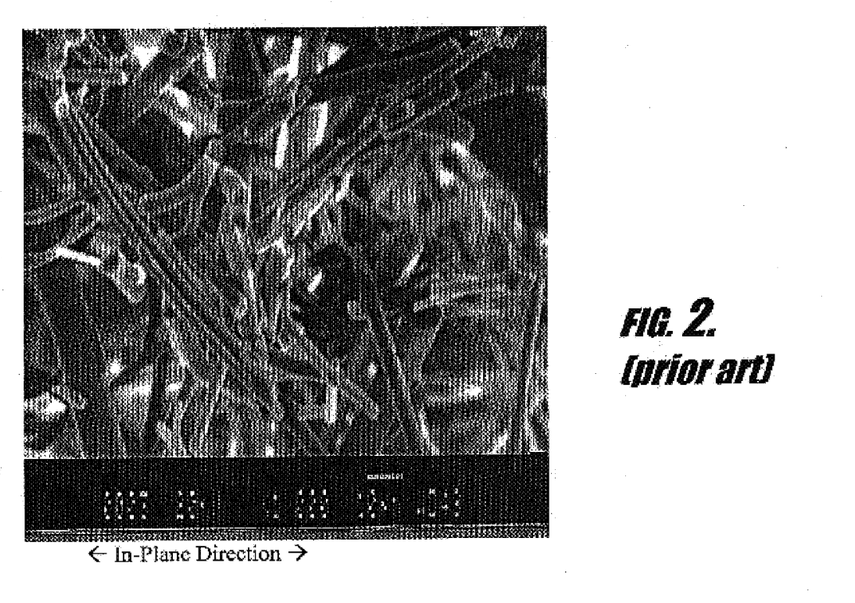
FIG. 2 is an enlarged micrograph of ceramic fibers randomly arranged in insulating materials of the prior art.
Figure 3:
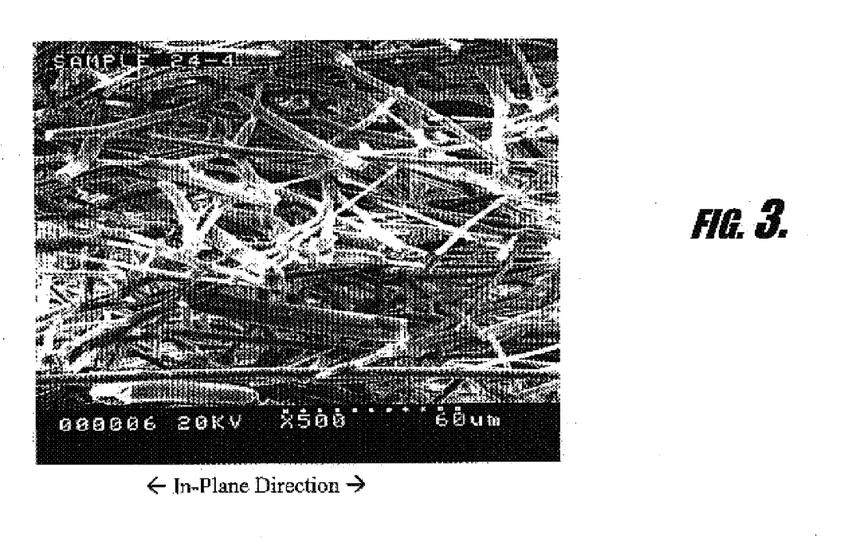
FIG. 3 is an enlarged micrograph of the oriented fibers of an embodiment of the invented insulating material.

The slurry is blended using a shear mixer, which disperses the fibers evenly throughout the mixture. It is noted that LI-900™ and AETB materials are produced using a v-blender in which the fibers are chopped and mixed via stainless steel blades, spinning in vertical orientation. These blades were designed to disperse fibers evenly among one another, but chopping them to lengths shorter than that of the invention. The slurry of the invention is mixed with a high shear disk and is designed to cause high radial flow rates within the slurry while maintaining relatively low axial flow rates. The result is a slurry in which the fibers are well dispersed among one another, but in which the fibers tend to be chopped at a moderate length. The insulative material that results from the fiber slurry produces random fiber orientation both in the in-plane and through-the-thickness directions. Referring to FIG. 2, an enlarged micrograph of AETB insulative tile material reveals that the fibers within the tile are arranged in an almost random pattern with respect to one another. FIG. 3 shows an enlarged micrograph of an insulative tile produced with the fibers, which have been blended with a shear blending procedure according to one embodiment of the present invention. As can be observed, the fibers of the present invention still have an almost random dispersion pattern, but tend to be individually oriented along a common plane, referred to hereinafter as the "in-plane" direction. The orientation of the fibers in the in-plane direction imparts several favorable qualities to the insulative material, which will be discussed in the disclosure below. The commonly oriented fibers are described herein as "substantially ordered". By substantially ordered, it is meant that, on average, the lengthwise direction of the fibers will be aligned in a 180 degree manner, perpendicular to the direction of press at the casting step.

In one embodiment of the invention, the fiber slurry is classified through a separation means in order to remove undesirable solids, known as inclusions or shot from the fiber slurry suspension. See step 25. Manufacturing of the ceramic fibers is done by drawing extremely thin fibers from a large body of ceramic slurry mixture. During production, two main problems occur. First, relatively large ceramic beads, known as shot, may be spewed from the production line and into the ceramic fiber material. Second, the ceramic material may form clumps due to the high temperatures experienced during the sintering of the ceramic fiber, as well as due to the handling and packaging procedure employed thereafter. In either case, the shot or clumps are undesirable in the production of the insulative material because the large volume of solid represented by the shot and clumps tends to conduct heat more readily than the thin ceramic fibers.

To solve the problem associated with shot and clumps, the fiber slurry of the invention is circulated through a classifier, a device that separates large solids from solid-liquid suspensions. Separation means are any means known in the art of separating large solid particles from a solid-liquid suspension. Such separation means may include, but are not limited to, cone classifiers, liquid cyclones, drag classifiers, rake and spiral classifiers, bowl desilters, hydroseparators, solid-bowl centrifuges, and counter-current classifiers. Due to its low cost of operation, the liquid cyclone is the preferred means of separating large solids from the slurry.

Figure 4:
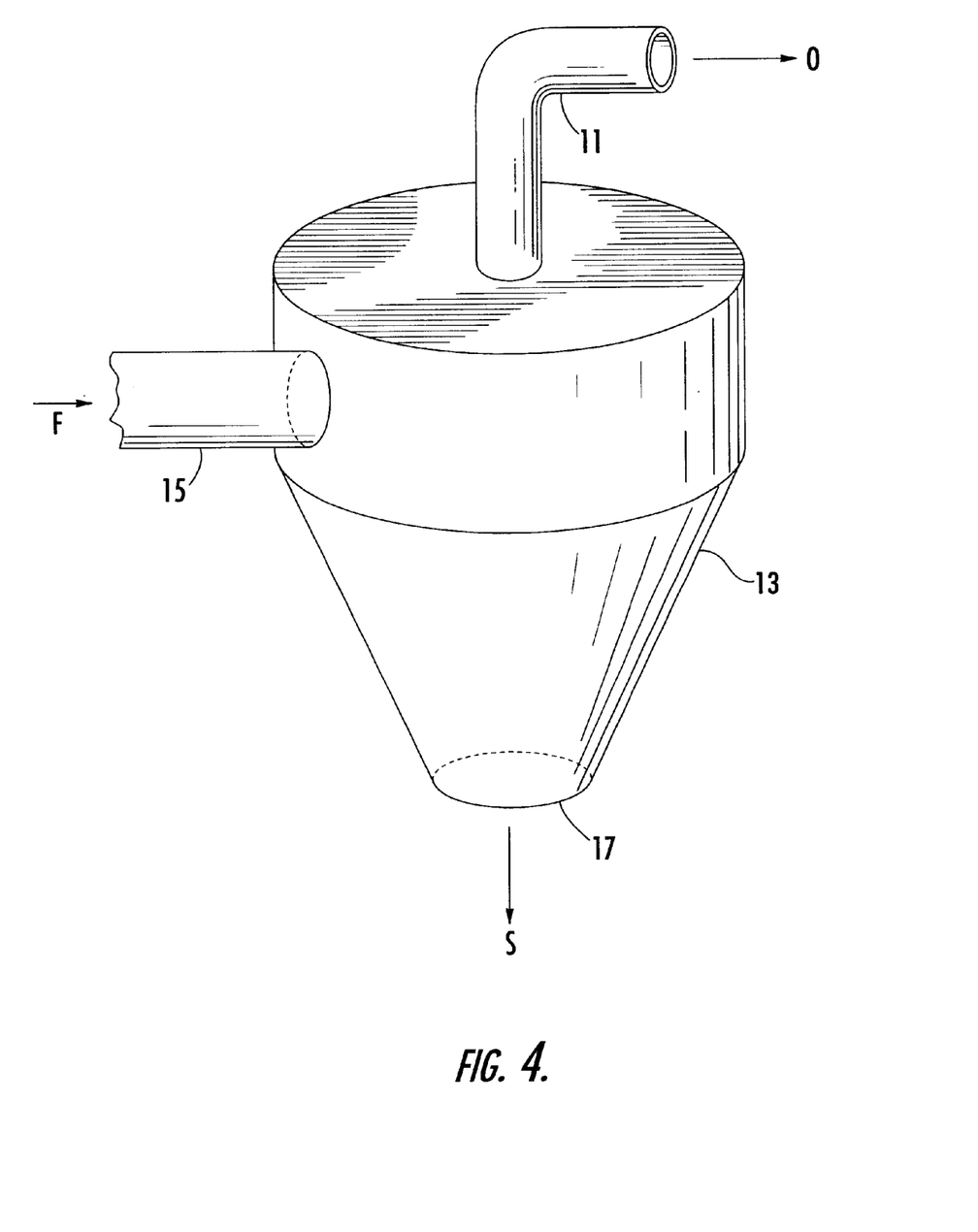
FIG. 4 is a drawing of a liquid cyclone for use with one embodiment of the invention.

Referring to FIG. 4, a liquid cyclone has an upper pipe that extends downward into a conical shell 13. A feed pipe 15 introduces feed slurry "F" into the conical shell 13 at a rate and pressure such that only a portion of the liquid-solid mixture "S", known as sands, is allowed to escape through a bottom opening in the shell portion 13. The remaining slurry is projected upwards through the upper pipe 11. The slurry feed enters the conical portion of the cyclone at a tangent to the outer periphery of the cone, so the slurry is projected around and around the cyclone apparatus. Due to centrifugal force, the heavier particles of the slurry, i.e. the shot and clumps, tend to be forced against the walls of the cone 13 and move down to the bottom outlet 17 of the cone. The remaining liquid and lightweight shot-free fibers are removed through the upper pipe as overflow "O". After separation, the amount of water in the slurry is adjusted, if necessary, and preparation of the insulation material is continued.

After removal of inclusions, if applicable, the slurry is transferred into a casting box, step 27. A casting box may take any of a variety of configurations, but is preferably a container having sidewalls of a particular configuration and having a porous bottom plate. Since the shape of the wet billet formed in the casting box will approximate the shape of the final insulating tile billet produced by this method, it is more convenient to utilize a casting box which has a shape approximating the shape of the desired finished tile billet. Typically, the shape of the box has a rectangular or square cross-section.

Excess water from the slurry is allowed to drain, step 29, from the casting box through the porous stainless steel mesh-screen bottom of the container. Water removal may be performed at a faster rate by applying a vacuum at the bottom of the casting box. A vacuum ranging from 0.01 MPa to 0.04 MPa is sufficient to remove the bulk of the water residing among the otherwise porous amount of ceramic fiber.

After the bulk of the water is removed from the slurry, the slurry is pressed, step 31, by moving the press plate towards the bottom wall of the casting box, compacting the ceramic fibers and forcing a portion of the remaining water out the box. The wet billet, comprised of ceramic fiber, is pressed within the box to a certain height that corresponds to the desired density. The wet billet is maintained under compressed load for approximately 4 to 5 minutes to remove as much excess water as possible. It has been found that allowing the fibers to rest along the bottom of the casting box while pressing the slurry and fibers from above causes the fibers to preferentially align in the in-plane direction (perpendicular to the press direction). The in-plane arrangement of the ceramic fibers provides a finished insulation material, which exhibits favorable strength and thermal conductivity.

After pressing, the wet billet is removed from the casting box and placed into a conventional oven, which is preheated to 200° F. to 500° F., step 33, to remove residual water from the billet. A typical drying process, depending on the size and density of the wet billet, requires at least 24 to 36 hours to completely remove excess water. One way to determine if a green billet is ready for firing is to check its dried weight. If the dried weight is equal to 90% of the total fibers used in the slurry, the billet is ready for firing. The balance 10% is considered material loss, which is usually captured within the hydrocyclone and in the transferring pipe lines. After heating, the porous fiber billet should be substantially free of water. A dried billet should not be exposed to ambient air for more than 1 hour as it tends to absorb moisture and the residual moisture could lead to cracking during firing.

After heating, the billet is fired, step 35, at a temperature range from about 2300° F. to about 2600° F. for a period of 1 to 5 hours depending on the billet density. Slow heating rate during ramping up is required to minimize billet cracking. The initial heating rate is 20° F./min from room temperature to 2000° F., and 3° F./min from 2000° F. to the maximum soak temperatures. During the firing of the ceramic fibers, the boron carbide decomposes, forming borates within the fibrous material. The borate compounds agglomerate at the junctions of the alumina and silica fibers and fuse the fibers together. Once fused, the ceramic material exhibits superior strength and thermal conductivity, with no need for supplemental binders. The ability to bind the fibers with only the borate compounds greatly simplifies the production of the fiber material by eliminating the processing steps formerly required to introduce and react binders into the insulating material. After firing, the material is cooled to room temperature.

Reaction cured glass (RCG) and Toughened Unipiece Fibrous Insulation (TUFI) coatings may optionally be used to coat the surface of the insulative tile to provide high emittance surface and surface durability. Unlike LI-900™ insulation, the invented insulative material resists slumping which is usually caused by the TUFI coating application process. The TUFI coating penetrates approximately 0.05 to 0.25" into the tile surface, and thus toughens the surface of the tile insulation, and provides a protective layer against the physical damage during flight or during servicing of the vehicle. The process for applying RCG and TUFI coatings can be found in U.S. Pat. No. 4,093,771 to James C. Fletcher, et al. and U.S. Pat. No. 5,079,082 to Daniel B. Leiser, et al., respectively.

If necessary, the finished insulating material may be machined to its final desired shape. Machining of the finished tile may be accomplished by the methods previously used in fabrication of LI-900™ tiles, AETB tiles, or other similar porous ceramic insulation tiles. However, it is important to maintain the orientation of the insulative material such that the in-plane direction of the ceramic fibers will be parallel to the inner and outer mold line planes of the RLV upon installation. Overall thermal conductivity at the through-the-thickness (TTT) direction of the tile is less than the thermal conductivity through the in-plane direction of the tile. Thus, the tile is machined such that the in-plane direction of the tile will not be positioned perpendicular to the surface of the vehicle during use.

The finished insulative material is most commonly machined into a 6"×6"×2" tile for installing on an RLV and is, therefore, referred to as a "tile" hereinafter. Of course, the superior thermal properties of the invented tile could be utilized in any myriad of applications requiring a low density, highly insulative material such as the invented tile.

As mentioned, the ceramic fibers of the tile are randomly dispersed among one another, but are processed in such a way that the fibers are physically oriented in the in-plane direction of the tile rather than being randomly oriented as in older generation lightweight tiles. Referring again to FIG. 3, it is seen that the fibers are best described as having a tendency to be arranged in the in-plane direction. This arrangement provides an increase in tensile strength in the in-plane direction, which prevents shrinkage and slumping, which is problematic in the older generation lightweight tiles. Although the fibers of the invention tend to arrange in the in-plane direction, the fibers are not strictly oriented or ordered such that sufficient number of fibers remain at angles or perpendicular to the in-plane direction providing adequate through-the-thickness (TTT) tensile strength.

In order to take full advantage of the improved thermal conductivity in the through-the-thickness direction, the tile should be installed on the RLV such that the in-plane direction of the fibers is parallel to the plane of either surface of the tile which make up the outer mold line or the inner mold line of the insulation layer. Thus, thermal energy must pass through the tile at an angle perpendicular to the orientation of the fibers within the material. In most circumstances, the planar or near planar surfaces of the inner and outer tile surfaces will be parallel. In circumstances where the inner and outer mold lines do not form parallel planes, the in-plane direction of the fibers may be situated parallel to either the lower or upper surface planes or in between the direction of the two planes.

Figure 5:
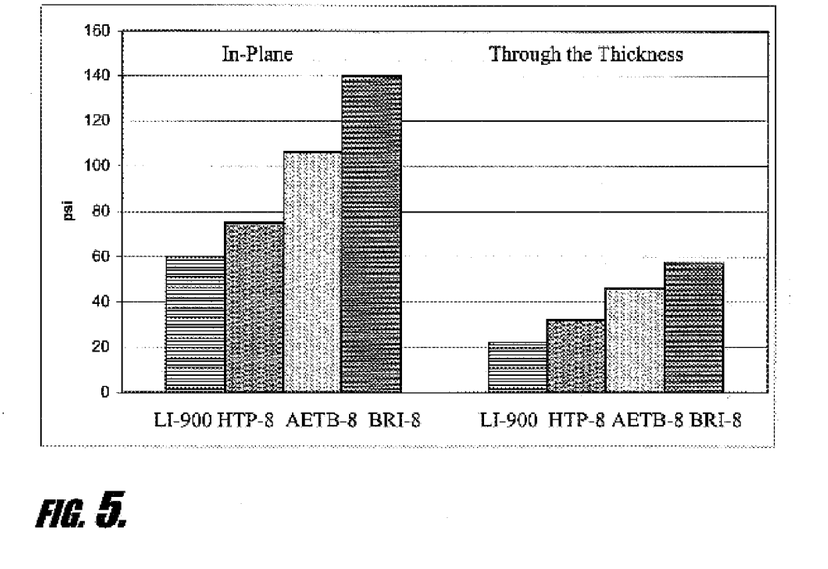
FIG. 5 is a bar chart illustrating tensile strength of one embodiment of the invented material compared to prior art.
Figure 6:
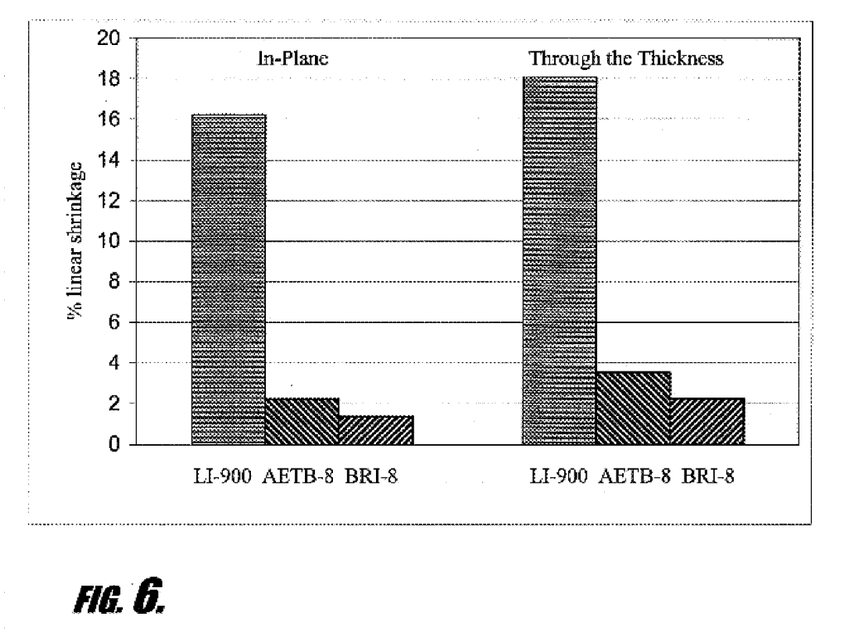
FIG. 6 is a bar chart illustrating linear shrinkage of one embodiment of the invented material compared to prior art.

Referring to FIG. 5, the tensile strength of an insulative tile having a density of 8 lbs/ft$^3$, for example, is approximately 110–140 lbs/in$^2$ in the in-plane direction and approximately 35–55 lbs/in$^2$ in the through-the-thickness direction of the tile. The dramatic increase in tensile strength in both the in-plane and through-the-thickness directions relative to other ceramic tiles is due to the physical orientation of the fibers within the tile, and also because of the superior bonding between the fibers resulting from the use of boron carbide sintering agent within the tile. Because a very low percentage, about 0.1 wt % to about 1.0 wt %, of boron-containing powder is required to properly bind the fibers, a relatively larger percentage of alumina fiber may be used as compared to the previous alumina based insulation, such as AETB and HTP (a newly invented Lockheed tile containing 78 wt % silica fibers and 22 wt % alumina fibers). Referring to FIG. 6, the percentage of linear shrinkage experienced after extended exposures to high heat environments is considerably lower in the invented tile than in the older generation lightweight ceramic insulative tiles. For example, after heat treatment at 2300° F. for a period of 16 hours, an 8 lbs/ft$^3$ sample of the new insulative material had the least shrinkage of all, 7–8 times lower than LI900 and 2 times lower than AETB-8.

Figure 7:
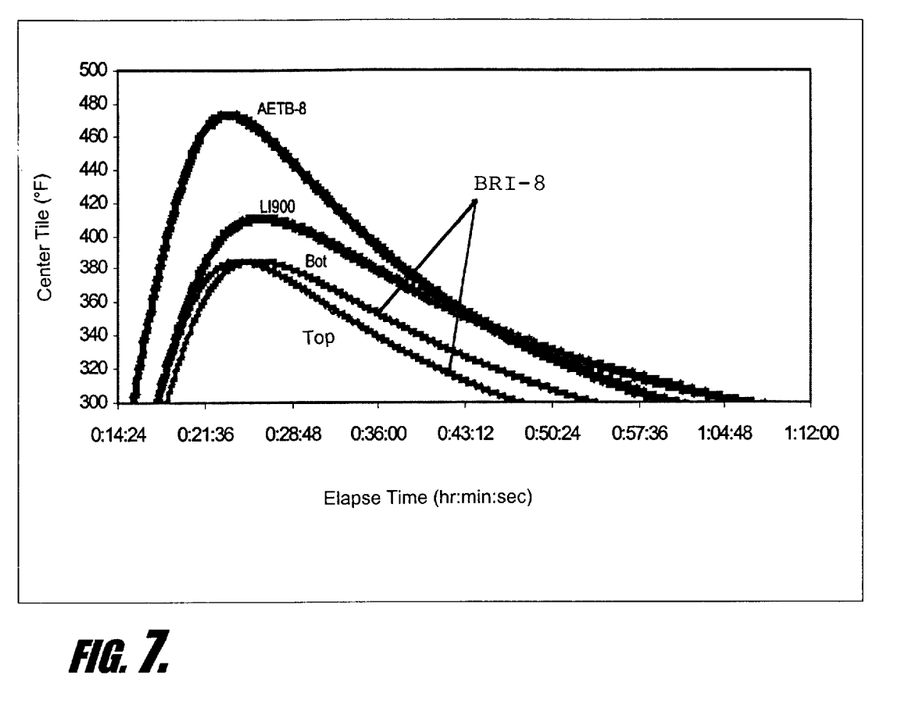
FIG. 7 is a graph showing backface temperature response of one embodiment of the invented material relative to prior art.

As shown in FIG. 7, an insulative tile of the present invention advantageously has a lower backface temperature response than either an AETB-8 tile or an LI900 tile. In this graph, the top and bottom portions of the insulative tile of the present invention are designated "Top" and "Bot", respectively. These positional designations are based upon the direction in which the billet was pressed with the top portion being proximate to the surface of the billet subjected to the pressing force.

An alternative procedure in production of a low-density billet is by introducing burnable-fillers. The purpose of the fillers is to significantly reduce the density gradient from top to bottom of a finished billet, enhancing microstructure and density uniformity throughout the entire material, as well as to provide structural support during casting, minimizing collapse of the wet slurry. When a filler is incorporated, the compressed billet height and firing profile are modified to maintain similar density to those without filler incorporated. For an 8 lb/ft$^3$ billet, the compressed billet height is between 5–6 inches depending amount of filler used, and the firing profile begins at pre-heating the furnace to 300° F., but maintaining the same peak temperature of 2450° F. for duration of 3 hours.

The following examples illustrate methods of preparing silica/alumina fused fiber porous materials in accordance with the invention. The examples are intended to illustrate, but in no way limit, the scope of the invention.

EXAMPLE 1

An 8 lbs/ft$^3$ tile production billet having a finished size of 10"×10"×5.5" was fabricated according to the present invention in the manner as follows: 4 grams of boron carbide powder, 1082 grams of silica fiber, and 518 grams of alumina fiber were added in a tub containing 20 gallons of de-ionized water and 10 mL of surfactant. The conductivity of the water was measured, which must be less than 1 MOH, prior to the addition of the raw fibers, boron carbide powder, and surfactant. Mixing of the raw materials was conducted using the shear mixer for a total time of 6 minutes. The slurry was then pumped out of the tub traversing through the hydrocyclone and into the casting tower. Once the slurry has been completely transferred into the 11.5-inch by 11.5-inch casting box, the slurry was manually stirred using a stirring paddle for 2 minutes. After which, water was drained out of the casting box. Once most of the water has been drained, compression loading was applied onto the wet billet until the billet thickness reached ~5.3 to 5.5 inches. Compression load was held for 4 minutes and the billet was then removed from the casting box. Thereafter, the billet was placed in the 300° F. drying oven for at least 24 hours or when the weight reaches 90% of the total raw fibers. Once dried, the billet was set inside the furnace with its bottom side up. Ceramic setter bars and 0.5-inch thick ceramic plate were also used as part of the firing setup. Sintering of the fibers occurred at 2450° F. for 3 hours. After removal from the furnace, the as-fired billet was trimmed to the 10-inch by 10-inch by 4.75-inch dimension. Tile specimen of specified dimension, usually a 6-inch by 6-inch by 2-inch, was then machined from the trimmed billet.

EXAMPLE 2

A deviation from Example 1 is a fabrication of tile production billets having similar finished billet size and bulk densities of 7 lb/ft$^3$ and 12 lb/ft$^3$. For both tile densities, a similar process as indicated in Example 1 was employed. However for the 7 lb/ft$^3$, the thickness of the billet was instead pressed to 7.5 inches while the 12 lb/ft$^3$ was pressed to 3.5 inches. The final thickness of the billets, after firing, were 6.5" and 3" for the 7 lb/ft$^3$ and the 12 lb/ft$^3$, respectively.

EXAMPLE 3

Billets of larger planform, 13.5-inches by 13.5-inches, were fabricated using the same procedure indicated in Example 1. The raw materials were increased based on linear relationship in increasing the volume from 10"×10"×5" to 13.5"×13.5"×5", while maintaining the same fiber ratios.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An insulative material comprising:
    a porous body of sintered ceramic fibers,
        wherein said ceramic fibers comprise
        about 60 wt % to about 80 wt % silica fibers;
        about 20 wt % to about 40 wt % alumina fibers; and
        about 0.1 wt % to about 1.0 wt % boron-containing powders
        wherein said silica and alumina fibers are substantially oriented.

2. The material of claim 1, wherein the bulk density of the porous body ranges from 6 lb/ft$^3$ to 20 lb/ft$^3$ after firing.

3. The material of claim 1, wherein said ceramic fibers comprise
    about 65 wt % to about 75 wt % silica fibers;
    about 25 wt % to about 35 wt % alumina fibers; and
    about 0.1 wt % to about 0.5 wt % boron-containing powders.

4. The material of claim 1, wherein the material is in the form of a tile having a thickness defined by a first surface and a second surface which opposes said first surface.

5. The material of claim 4, wherein the physical arrangement of the ceramic fibers is substantially ordered and substantially parallel to the plane of at least one of said first and second surfaces of the tile.

6. The material of claim 4, wherein said first surface and said second surface are coplanar.

7. The material of claim 6, wherein the physical arrangement of the ceramic fibers is substantially ordered and substantially coplanar with said first surface of the tile.

8. The material of claim 1, wherein the ceramic fibers are chopped.

9. The material of claim 8, wherein the chopped fibers have an average length ranging from about 200 µm to about 500 µm.

10. The material of claim 8, wherein the chopped fibers have an average diameter range of about 2 µm to about 5 µm.

11. The material of claim 10, wherein the chopped fibers have an average diameter of about 3.0 µm.

12. The material of claim 3, wherein said ceramic fibers comprise
    about 67 wt % silica fibers;
    about 32.75 wt % alumina fibers; and
    about 0.25 wt % boron-containing powders, including boron carbide ($B_4C$).

13. The material of claim 12, wherein the material is in the form of a tile having a thickness defined by a first surface and a second surface which opposes said first surface.

14. The material of claim 13, wherein the physical arrangement of the ceramic fibers is substantially ordered and substantially parallel to the plane of at least one of said first and second surfaces of the tile.

15. The material of claim 12, wherein said first surface and said second surface are coplanar.

16. The material of claim 15, wherein the physical arrangement of the ceramic fibers is substantially ordered and substantially coplanar with said first surface of the tile.

17. The material of claim 12, wherein the ceramic fibers are chopped using shear mixer.

18. The material of claim 17, wherein the chopped fibers have an average length ranging from about 200 µm to about 500 µm.

19. The material of claim 17, wherein the chopped fibers have an average diameter range from about 2 µm to about 5 µm.

20. The material of claim 19, wherein the chopped fibers have an average diameter of about 3.0 µm.

21. A method of producing an insulative material comprised of:
    forming an aqueous slurry of about 60 wt % to 80 wt % silica fibers, about 20 wt % to 40 wt % alumina fibers, and about 0.1 wt % to 1.0 wt % boron-containing powder,
    removing at least a portion of the water from the slurry;
    pressing the ceramic fibers into a wet billet;
    removing residual water from the wet billet; and,
    fusing the ceramic fibers to one another.

22. The method of claim 21, wherein the step of forming an aqueous slurry includes chopping and blending the ceramic fibers.

23. The method of claim 22, further comprising the step of adding burnable fillers in the fiber slurry during the step of chopping and blending of ceramic fibers.

24. The method of claim 22, wherein the step of chopping and blending the ceramic fibers includes mixing said ceramic fibers with a shear mixer.

25. The method of claim 22, wherein the step of chopping and blending the ceramic fibers includes mixing said fibers such that the fibers are well dispersed and have a certain length within a predefined range.

26. The method of claim 22, further comprising the step of separating inclusions from the slurry of ceramic fiber.

27. The method of claim 26, wherein the step of separating inclusions from the slurry comprises pumping the blended slurry through a separation means prior to pressing the ceramic fibers.

28. The method of claim 27, wherein the separation means is a cone classifier, liquid cyclone, drag classifier, rake and spiral classifier, bowl desilter, hydroseparator, solid-bowl centrifuge, or counter-current classifier.

29. The method of claim 28, wherein the separation means is a liquid cyclone.

30. The method of claim 21, wherein the step of pressing the ceramic into a wet billet comprises:
    transferring the slurry into a casting box;
    draining excess water from the casting box; and
    applying pressure upon the fibers.

31. The method of claim 30, wherein applying pressure comprises applying pressure vertically from a top to a bottom of the casting box, thereby orienting the fibers in an in-plane direction with respect to the bottom of the casting box.

32. The method of claim 30, wherein the step of draining excess water from the casting box comprises extracting excess water from the casting box via a vacuum.

33. The method of claim 21, wherein the step of removing residual water from the wet billet comprises heating the wet billet.

34. The method of claim 33, wherein the step of heating the wet billet comprises heating the billet at 200° F. to 500° F. for at least 24 hours and up to 36 hours.

35. The method of claim 34, wherein the step of heating the wet billet comprises heating the billet at about 300° F. for a period of about 30 hours.

36. The method of claim 21, wherein the step of fusing said fibers comprises firing said billet.

37. The method of claim 36, wherein the step of firing the billet comprises firing the billet at a temperature range from about 2300° F. to about 2600° F. for about 1 to about 5 hours.

38. The method of claim 21, wherein the step of forming an aqueous slurry comprises the step of forming an aqueous suspension of mixed ceramic fibers wherein said fibers comprise about 65 wt % to about 75 wt % silica fibers; about 25 wt % to about 35 wt % alumina fibers; and about 0.1 wt % to about 0.5 wt % boron-containing powders.

39. The method of claim 38, wherein the step of forming an aqueous slurry comprises the step of forming an aqueous suspension of mixed ceramic fibers wherein said fibers comprise about 67 wt % silica fibers; about 32.75 wt % alumina fibers; and about 0.25 wt % boron-containing powders, including boron carbide ($B_4C$).

* * * * *